(12) United States Patent  
Tercero Vargas et al.

(10) Patent No.: US 10,887,888 B2  
(45) Date of Patent: Jan. 5, 2021

(54) METHODS AND MODULES FOR HANDLING CHANNELS IN A RADIO SPECTRUM

(71) Applicant: Telefonaktiebolaget LM Ericsson (publ), Stockholm (SE)

(72) Inventors: Miurel Isabel Tercero Vargas, Sollentuna (SE); Jonas Kronander, Knivsta (SE); Sachin Sharma, Huddinge (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 254 days.

(21) Appl. No.: 15/529,534

(22) PCT Filed: Nov. 20, 2015

(86) PCT No.: PCT/SE2015/051254  
§ 371 (c)(1),  
(2) Date: May 25, 2017

(87) PCT Pub. No.: WO2016/089284  
PCT Pub. Date: Jun. 9, 2016

(65) Prior Publication Data  
US 2017/0318591 A1 Nov. 2, 2017

Related U.S. Application Data

(60) Provisional application No. 62/086,337, filed on Dec. 2, 2014.

(51) Int. Cl.
| | | |
|---|---|---|
| *H04W 72/08* | (2009.01) | |
| *H04W 72/04* | (2009.01) | |
| *H04W 16/14* | (2009.01) | |

(52) U.S. Cl.  
CPC ....... *H04W 72/08* (2013.01); *H04W 72/0433* (2013.01); *H04W 16/14* (2013.01); *H04W 72/0453* (2013.01); *H04W 72/082* (2013.01)

(58) Field of Classification Search  
CPC ..... H04W 16/14; H04W 28/08; H04W 28/16; H04W 72/082; H04W 74/0816; H04W 52/0216; H04W 72/0486  
See application file for complete search history.

(56) References Cited

U.S. PATENT DOCUMENTS

| | | | | |
|---|---|---|---|---|
| 2004/0229566 | A1* | 11/2004 | Wang | H04L 41/046 |
| | | | | 455/63.1 |
| 2005/0153702 | A1* | 7/2005 | Cuffaro | H04W 16/08 |
| | | | | 455/452.1 |

(Continued)

OTHER PUBLICATIONS

Office Action issued in application No. 15816898.9; dated Jun. 18, 2018; 05 pages.

(Continued)

*Primary Examiner* — Romani Ohri  
(74) *Attorney, Agent, or Firm* — Patent Portfolio Builders, PLLC

(57) ABSTRACT

A method and an OCA module of a radio network node (RNN) for handling a request for at least one channel and a method and an OCA module of a core network node (CNN) for providing at least one channel operable by a RNN are disclosed. The OCA module receives, from an RMM module, the request. The OCA module sends, to the OCA module of the CNN, the request and a set of local parameters. The OCA module of the CNN assesses channels to select one or more channels in a first level assessment, wherein the assessment is based on the set of local parameters and a set of global parameters. The OCA module of the CNN sends the one or more channels to the OCA module. The OCA module assesses, in a second level assessment, said one or more channels, to obtain at least one second level channel.

18 Claims, 9 Drawing Sheets

(56) References Cited

U.S. PATENT DOCUMENTS

| | | | |
|---|---|---|---|
| 2008/0037512 A1* | 2/2008 | Aljadeff | H04W 64/00 370/350 |
| 2008/0069029 A1* | 3/2008 | Chow | H04W 8/005 370/328 |
| 2008/0192721 A1* | 8/2008 | Pernu | H04W 72/1215 370/345 |
| 2010/0091731 A1* | 4/2010 | Kim | H04W 16/14 370/329 |
| 2010/0304678 A1* | 12/2010 | Chandra | H04W 16/14 455/62 |
| 2012/0134328 A1 | 5/2012 | Gauvreau et al. | |
| 2013/0165134 A1 | 6/2013 | Touag et al. | |
| 2013/0295948 A1* | 11/2013 | Ye | H04W 72/0453 455/452.1 |
| 2014/0062669 A1* | 3/2014 | Mena | H04W 52/0219 340/10.5 |
| 2014/0086081 A1* | 3/2014 | Mack | H04L 5/006 370/252 |
| 2014/0342745 A1* | 11/2014 | Bhushan | H04W 74/04 455/450 |
| 2015/0055541 A1* | 2/2015 | Zhang | H04W 72/005 370/312 |
| 2015/0098397 A1* | 4/2015 | Damnjanovic | H04W 74/08 370/329 |
| 2015/0117368 A1* | 4/2015 | Barriac | H04W 72/0413 370/329 |

OTHER PUBLICATIONS

International Search Report and Written Opinion of the International Searching Authority for International Application No. PCT/SE2015/051254 (dated Aug. 14, 2015).

\* cited by examiner ns that do not guarantee predictable interference levels. A Spectrum Controller (SC) function in the network, or implemented as a cloud service somewhere in a cloud, monitors the long term performance of resources assigned to various parts of the network. The spectrum controller also negotiates with an external entity, e.g., another network operator, in order to obtain the availability of a channel, and can reach decisions on how to share the channel.

METHODS AND MODULES FOR HANDLING CHANNELS IN A RADIO SPECTRUM

CROSS REFERENCE TO RELATED APPLICATIONS

This application is a 35 U.S.C. § 371 national stage application of PCT International Application No. PCT/SE2015/051254, filed on Nov. 20, 2015, which claimed domestic priority to U.S. Provisional Patent Application No. 62/086,337, filed Dec. 2, 2014, the disclosures and content of which are incorporated by reference herein in their entirety.

TECHNICAL FIELD

Embodiments herein relate to wireless communication systems, such as telecommunication networks. In particular, a method and an Operating Channel Assessment (OCA) module of a radio network node for handling a request for at least one channel as well as a method and an OCA module of a core network node for providing at least one channel operable by a radio network node are disclosed. Corresponding computer programs and carriers therefor are also disclosed.

BACKGROUND

In future wireless communication systems, such as fifth generation (5G) networks, there will be communicating nodes that need to make a choice of a channel, or physical radio resource, to be used for communication with each other. A reason for this is that very often, radio spectrum associated with such wireless communication system will be shared with other networks. Such radio spectrum may often be available under rules that do not guarantee predictable interference levels. A Spectrum Controller (SC) function in the network, or implemented as a cloud service somewhere in a cloud, monitors the long term performance of resources assigned to various parts of the network. The spectrum controller also negotiates with an external entity, e.g., another network operator, in order to obtain the availability of a channel, and can reach decisions on how to share the channel.

Consider a wireless network that is made up of multiple connected wireless nodes, where information is carried along pre-determined routes for every source and destination pair. Typically, information flow in the network is from an aggregation point that is connected to the mobile core network towards a wireless device or in the reverse direction. Alternatively, this development also applies to any cluster of wirelessly connected nodes. A particular preferred implementation of the network is the Ultra-Dense Network (UDN), where the wireless nodes in the network are abundantly deployed and can establish multiple routes between pairs of nodes by means of a Radio Resource Management (RRM) function, or routing function, which is a part of RRM. The routing function is the function that assigns routes, and thus establishes network topology. It also allocates radio resources for established links between two neighboring wireless nodes. The RRM function is able to identify the importance of a channel for the routing solution. The Spectrum Controller is not able to identify the importance of a channel. The RRM function may conclude that the system performance would be much improved if an additional channel becomes available.

It is assumed herein that the future spectrum landscape is such that multiple bands, possibly with different regulatory frameworks, are accessible to the nodes in the Future Radio Access (FRA) system, such as in the above mentioned 5G networks. It is further assumed that the optimal choice of spectrum band for a node in the system will be dependent on time and location. This requires accessibility to spectrum bands both from a regulatory perspective, i.e., the FRA system is allowed to access different bands, and from a technical perspective. The different nodes are technically capable of accessing the different spectrum bands.

As an example future spectrum landscape one can envision the situation depicted in FIG. 1. Therein the FRA system is able to access primary and licensed bands, as well as other bands in a Licensed Shared Access (LSA) fashion, or unlicensed bands. A typical choice would be choose the primary band for reliability, but local interference situations or propagation conditions could make it more beneficial for some nodes to use other bands with other regulatory frameworks.

FIG. 1 illustrates an example future spectrum landscape. Spectrum opportunities will exist in multiple bands and under diverse regulatory approaches, requiring a multitude of different sharing capabilities from systems that aim to leverage on this flexibility.

Known spectrum sharing mechanisms are limited in application. Many wireless networks operate in unlicensed bands, where certain regulatory limitations on bandwidth, power spectral density and deployment characteristics are used to enable sharing. An example of such operation is Wireless Fidelity (Wi-Fi) or Bluetooth, where spectrum sharing occurs without active regulatory control. Wi-Fi systems share spectrum using interference avoidance by channel selection and collision avoidance. Disparate systems do interfere with each other and can suffer degraded performance. Slightly more sophisticated spectrum sharing can be done on a binary basis in Television White Space (TVWS) systems or in systems that use LSA for binary sharing of spectrum between a wireless operator and a primary user.

SUMMARY

An object may be how to manage assessment and/or ranking of channels in the wireless communication system of the above mentioned kind.

According to an aspect, the object is achieved by a method, performed by a radio network node, such as an Operating Channel Assessment (OCA) module thereof, for handling a request for at least one channel. Accordingly, a method, performed by an OCA module of a radio network node, for handling a request for at least one channel is provided. The OCA module receives, from a Radio Resource Management module of the radio network node, the request for the at least one channel. The OCA module sends the request and a set of local parameters. The set of local parameters relates to one or more of throughput, bandwidth, interference, frequency, and location. The OCA module receives, from the core network node, one or more channels in a first level assessment. The OCA module assesses, in a second level assessment, said one or more channels in the first level assessment, to obtain at least one second level channel. The OCA module sends said at least one second level channel to the RRM module.

According to another aspect, the object is achieved by a radio network node, such as a local OCA module, configured to perform the method directly above. Hence, there is provided an OCA module of a radio network node for handling a request for at least one channel. The OCA module is configured for receiving, from a Radio Resource Management "RRM" module of the radio network node, the request for said at least one channel. The OCA module is further configured for sending the request and a set of local parameters, wherein the set of local parameters relates to one or more of throughput, bandwidth, interference, frequency, and location. Moreover, the OCA module is configured for receiving, from the core network node, one or more channels in a first level assessment. The OCA module is further configured for assessing, in a second level assessment, said one or more channels in the first level assessment, to obtain at least one second level channel. Furthermore, the OCA module is configured for sending said at least one second level channel to the RRM module.

According to a further aspect, the object is achieved by a method, performed by a core network node, such as a central OCA module, for providing at least one channel operable by a radio network node. Hence, there is provided a method, performed by an OCA module of a core network node, for providing at least one channel operable by a radio network node. The OCA module of the core network node receives, from an OCA module of the radio network node, a request for the at least one channel, and a set of local parameters, wherein the set of local parameters relates to one or more of throughput, bandwidth, interference, frequency, and location. The OCA module of the core network node assesses channels, provided by a Global Location database, to select one or more channels in a first level assessment, wherein the assessment is based on the set of local parameters and a set of global parameters, wherein the set of global parameters relates to one or more of frequency, location, spectrum sharing, and spectrum availability. The OCA module of the core network node sends the first level channels to the OCA module of the radio network node.

According to a yet further aspect, the object is achieved by a core network node configured to perform the method directly above. Accordingly, there is provided an OCA module of a core network node, for providing at least one channel operable by a radio network node. The OCA module of the core network node is configured for receiving, from an OCA module of the radio network node, a request for the at least one channel, and a set of local parameters, wherein the set of local parameters relates to one or more of throughput, bandwidth, interference, frequency, and location. The OCA module of the core network node is configured for assessing channels, provided by a Global Location database, to select one or more channels in a first level assessment, wherein the assessment is based on the set of local parameters and a set of global parameters, wherein the set of global parameters relates to one or more of frequency, location, spectrum sharing, and spectrum availability. The OCA module of the core network node is configured for sending the first level channels to the OCA module of the radio network node.

Thanks to that the channel assessment is performed both locally, within an operator's network without any interaction with the GLDB, and globally while taking information from the GLDB into account, the channel assessment may be more robust towards errors. For example, in certain scenarios the channel assessment may be performed only locally, e.g. even without involvement of the core network node. Thus, not relying on any external entities that may not always be available, e.g. due to power failure, connection failure or the like.

Moreover, thanks to that the channel assessment is handled at the OCA module in the radio network node and in the core network node, the assessment of the channels is performed close to information on which the assessment is based. This means that the core network node need not receive local information from other existing operator networks. This would most likely cause overload at the core network node. Instead, global information is passed to the database. Then, the information in the database is accessed when needed.

According to further aspects, the object is achieved by computer programs and carriers for the computer programs corresponding to the aspects above.

An advantage is that operators may globally manage and/or share spectrum efficiently while taking local information into account.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
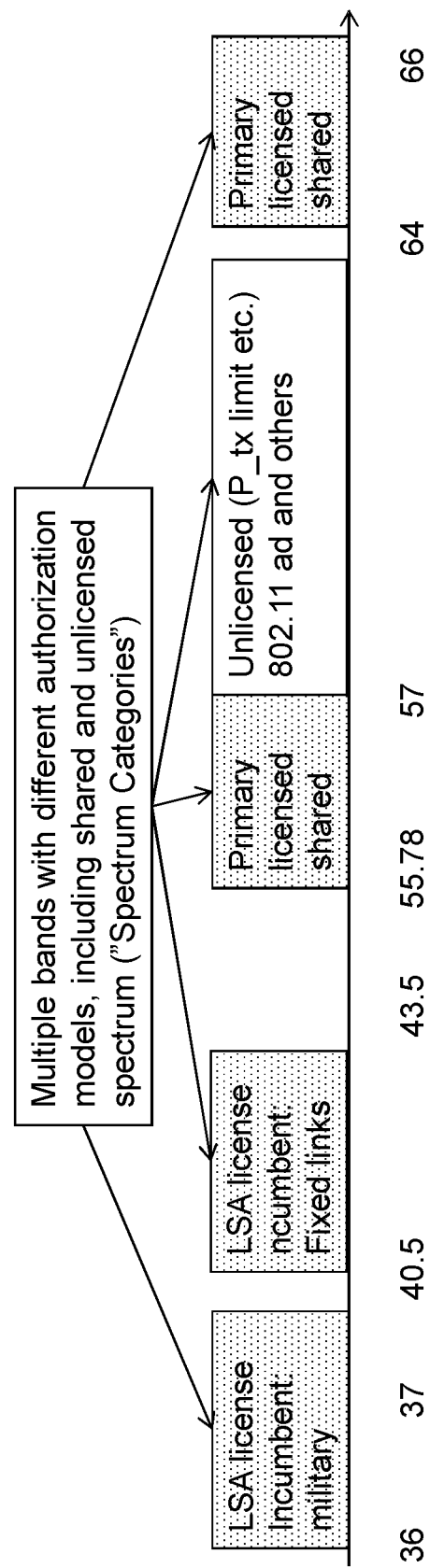
FIG. 1 is an illustration of a spectrum including multiple bands.

Throughout the following description similar reference numerals have been used to denote similar features, such as nodes, actions, steps, modules, circuits, parts, items elements, units or the like, when applicable. In the Figures, features that appear in some embodiments are indicated by dashed lines.

Figure 2:
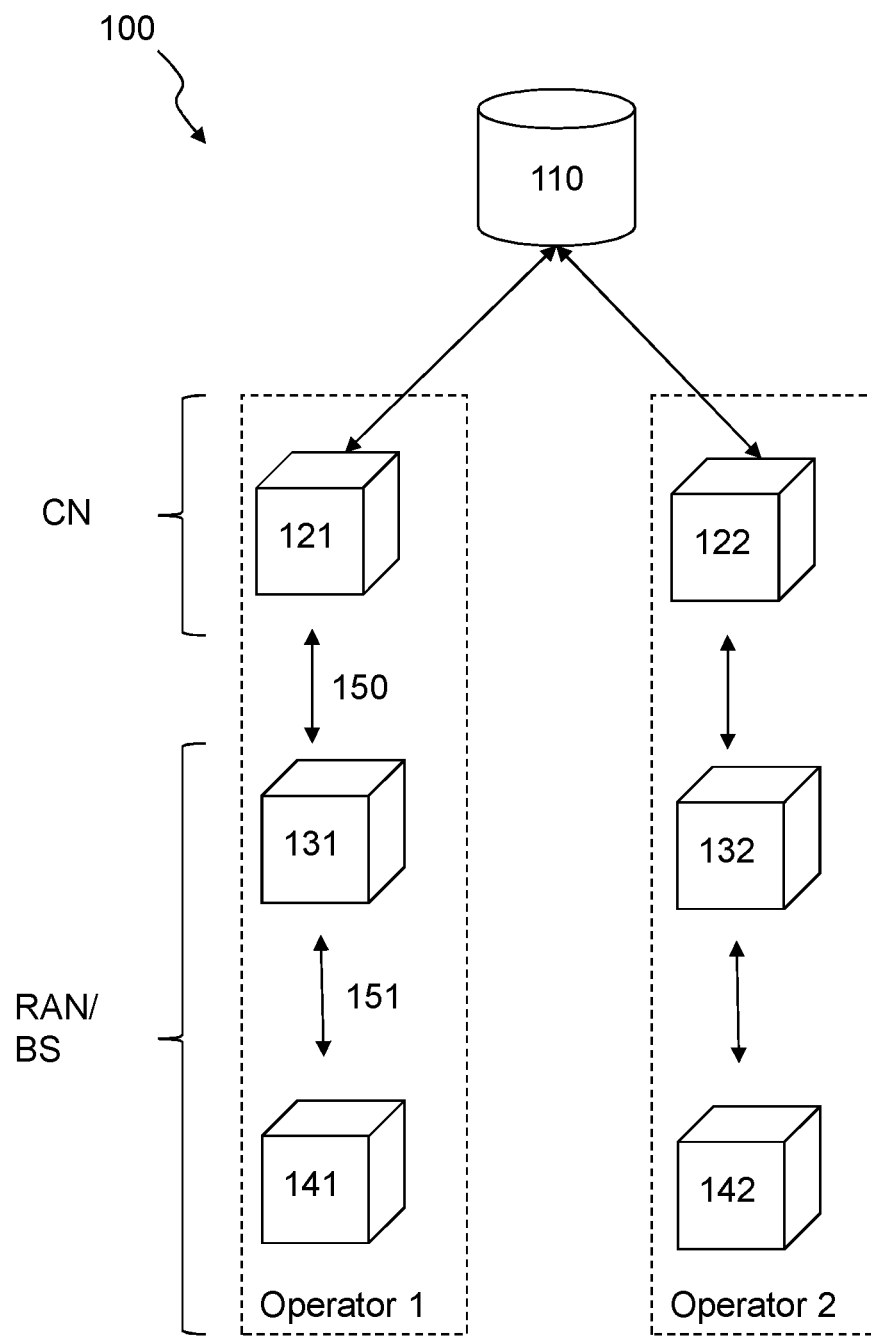
FIG. 2 is an overview of a network in which embodiments herein may be implemented.

FIG. 2 depicts an exemplifying wireless communication system 100 in which embodiments herein may be implemented. In this example, the wireless communication system 100 is a Long Term Evolution (LTE) network. In other examples, the wireless communication system 100 may be any cellular or wireless communication system, preferably a so called fifth generation (5G) wireless communication system, which may include evolutions of one or more of an LTE or LTE-Advanced network, a Global System for Mobile Communications (GSM), Universal Mobile Telecommunication System (UMTS) and the like.

The wireless communication system 100 may be said to comprise a globally accessible database (GLDB) 110, sometimes referred to as "global database". The database 110, such as a Global Location database, may be managed by a regulator handling regulations and/or license information for radio spectrums, aka channels. The database may be assessable from one or more operator networks, which here are illustrated by a first operator network 1 and a second operator network 2, shown as "operator 1" and "operator 2". The operator networks 1, 2 are similar in structure in this example. Therefore, only the first operator network 1 will be described in more detail. The same or similar description applies to the second operator network 2.

The first operator network 1 includes a core network node 121, which may access the database 110.

The core network node 121 may include one or more of a spectrum controller (SC), such as a spectrum controller module, an Operating Channel Assessment (OCA) module, which may be separate from the SC or included therein. More generally, the core network node 121 may be referred to as a network node, since in some examples the core network node may be located elsewhere, such as in a radio access network (see below).

Furthermore, the first operator network 1 includes a Radio Access Network RAN, which may include one or more radio network nodes BS. In the figure, the radio network node BS includes an Operating Channel Assessment (OCA) module 131 and a Radio Resource Management (RRM) module 141.

The radio network node BS may communicate 150 with the core network node 121. This communication may include user transmissions and/or control transmissions. The user transmissions may include user data, payload data, content data etc. The control transmissions may include control information relating to e.g. scheduling, authentication, mobility, radio resources/channels etc.

Similarly, the OCA module 131 and the RRM module 141 may communicate 151 with each other. This communications may be internal communication within the radio network node BS.

Accordingly in a similar manner, the second operator network 2 includes a further core network node 122, an OCA module 132, a RMM module 142.

As used herein, the term "radio network node" may refer to an evolved Node B (eNB), a Radio Network Controller (RNC), a Radio Base Station (RBS), a base station, a control node controlling one or more Remote Radio Units (RRUs), an access point or the like.

Figure 3:
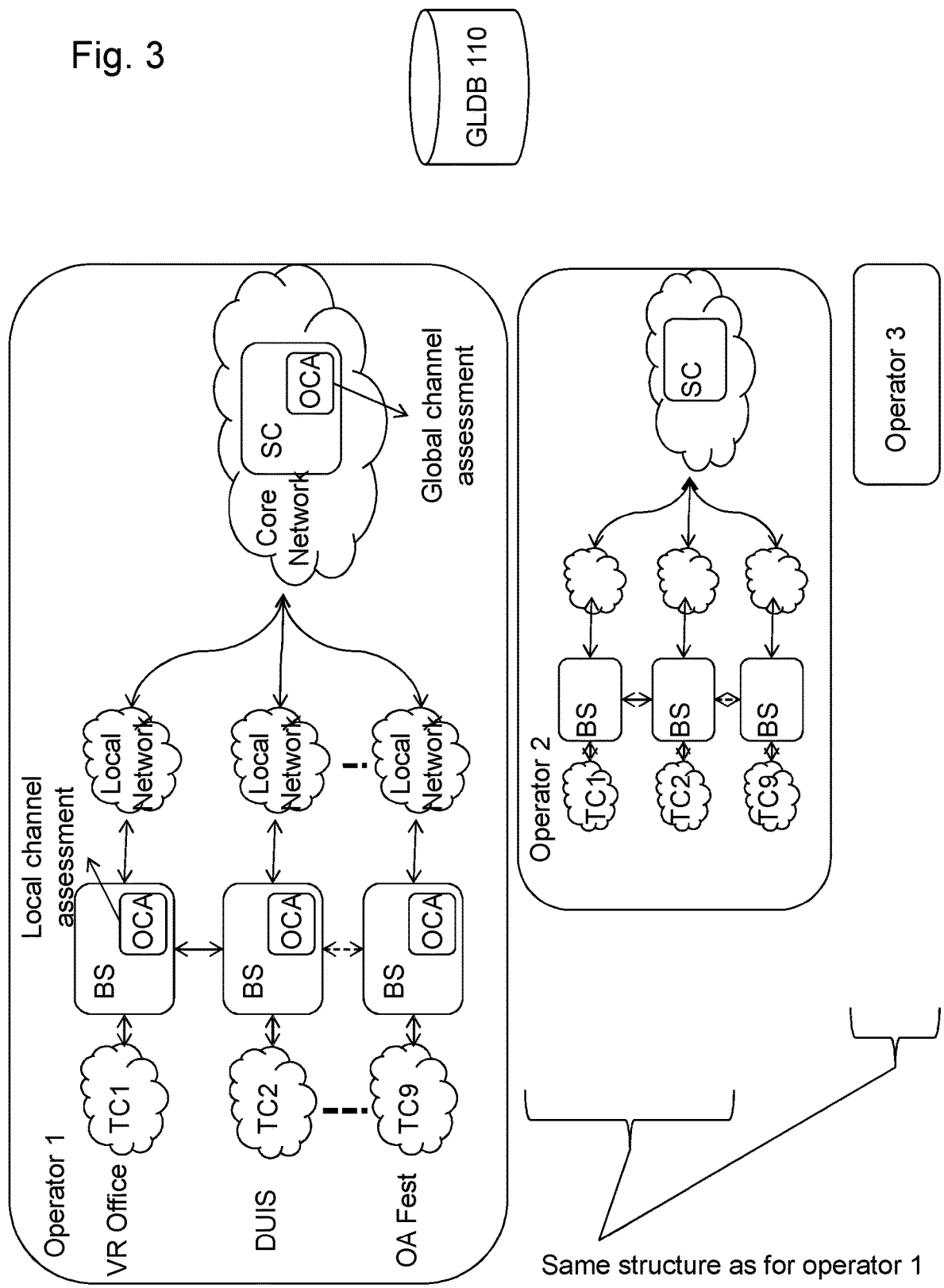
FIG. 3 is an overview of networks of a plurality of operators.

FIG. 3 presents an overview of a network architecture according to embodiments herein. The network architecture includes different devices which are serving different services in different environment and locations i.e virtual reality office, dense urban information society, shopping mall, open air festival.

For simplicity, it is assumed that such device will need to connect to a base station node (BS) and request for a channel to fulfill the service. The BS node will contain a function unit, OCA module (or Operating Channel Assessment unit), that is in charge of assessing on possible channel to be used. The local OCA function, or OCA module, from a given BS need to update the information about the channels before performing an assessment, and request channel and/or band assessment further up in the architecture to the spectrum controller. The local OCA module is sometimes referred to as BS/OCA.

A Spectrum Controller (SC) unit, or SC module, which will contain another OCA type of function will then provide assessment to the BS/OCA and both the OCAs will talk to each other using the same interface. The spectrum controller may be included in the core network node 121 in FIG. 2. This means that the core network node 121 of FIG. 2 may correspond to the core network, such as the Spectrum Controller. The SC may thus include a central, or global, OCA function/module. Sometimes the central OCA function is referred to as SC/OCA.

The SC unit may be seen as the entity that has a memory of the possible spectrum that an operator can access in a country, limited to the spectrum accessible in the market and by the equipment deployed. This is one of the reasons for why the SC should be in the core network. The SC has the possibility to access and/or negotiate with a geo-location database to get more information about the spectrum, and is able to negotiate spectrum for the operator across different systems or locations.

The local network entity, denoted "local network", shown in FIG. 3 can be seen as all the backhaul links that lead to the core network (Internet Protocol Multi-Protocol Label Switching (IP MPLS)/evolved packet core).

The OCA function/module may handle a table with information on every channel; this information will be some type of weighting or utility value, computed from a weighing or utility function that depend on the metric or parameter $p_j$ used for the assessment of the channel $f_i$. An example of the parameter $p_j$ can be location, throughput, spectrum sharing, spectrum availability, delay, energy efficiency, among others. An example on how the weighting table may look like is as follow:

|   | $p_1$ | $p_2$ | . . | $p_j$ |
|---|---|---|---|---|
| $f_1$ | $w_{1,1}$ | $w_{1,2}$ | . . | $w_{1,j}$ |
| $f_2$ | $w_{2,1}$ | $w_{2,2}$ | . . | . |
| . | . | . | . . | . |
| . | . | . | . . | . |
| $f_i$ | $w_{i,1}$ | $w_{i,2}$ | . . | $w_{i,j}$ |

One general way to express the relation between the weighting value, $w_{i,j}$, and its function is:

$$w_{i,j} = f(f_i, p_j)_j,  \qquad \text{Eq. 1}$$

Then the total channel weighted or value, $W_i$, will be:

$$W_i = f'(w_{i,j}), \qquad \text{Eq. 2}$$

A possible example of the function for the total channel weight, $W_i$, can be:

$$W_i = \Pi_{j=1}^{m} w_{i,j} \qquad \text{Eq. 3}$$

Where m is the number of parameters used for the assessment. The expected ranges for $w_{i,j}$ and $W_i$ will be:

$$0 \le w_{i,j} \le 1;\ 0 \le W_i \le 1$$

Where a higher value of $W_i$ describe a better channel. This means that the value $W_i$ may be used as a measure of channel quality. Expressed differently, the value $W_i$ is a ranking value of the channel, wherein the ranking value relates to an estimated quality of the channel.

Before presenting various embodiments herein with reference to FIG. 4, an example embodiment will be described briefly. In this example embodiment the following actions may be performed.

1. A method for the interaction between the entities and/or functionalities: the radio resource management (RRM) module 131 at the local base station BS, the OCA module at the local base station BS, the OCA at the global spectrum controller (SC), aka the core network node 121, and the geo-location database (GLDB) that may be somewhere in a cloud service.

2. The Operating Channel Assessment (OCA) functionality, to handle channel assessment and ranking implemented in two places: a. and b.:
   a. The core network node 121 serving a radio network node, operating in a cellular communication network.
      i. The RRM function from the BS node will request channel assessment to the OCA function of the same BS node, who will further request assessment from the OCA function of the SC in the core network.
      ii. The OCA function of the SC will be assessing the channel availability based on information taken from one and/or several of the following sources:
         1. an external entity, such as another network operator or spectrum broker
         2. the local BS node that is requesting the assessment
      iii. The assessing method will be perform based on a weighting or utility function that consider parameters relevant in the global context
      iv. The assessment will be forwarded to the local BS node
      v. Next time an assessment is created, previous assessment information will be considered.
   b. The BS node and/or in a radio network node serving a UE, operating in a cellular communication network
      i. The RRM function from the BS node will request channel assessment to the OCA function of the same BS node, who will further request assessment from the OCA function of the SC in the core network.
      ii. The OCA function of the BS will be assessing the channel availability based on information taken from one and/or several of the following sources:
         1. the OCA function from the global SC in the core network
         2. Local KPIs parameters in the BS node that has already being pre-configured
      iii. The assessing method will be performed based on a weighting or utility function that consider parameters relevant in the local context, i.e. systems KPI's throughput, delay, energy efficiency, and/or information from the global assessment
      iv. The assessment will be forwarded to the RRM function in the local BS node
      v. The RRM function in the local BS node chooses a channel based on the assessment and may request other type of work (i.e. channel negotiation) from the local/global OCA function.
      vi. Next time, an assessment is created, previous assessment information will be considered.

3. The method implements a learning process from the interchange of information between the four mentioned entities that will improve the assessment of the channels.

Figure 4:
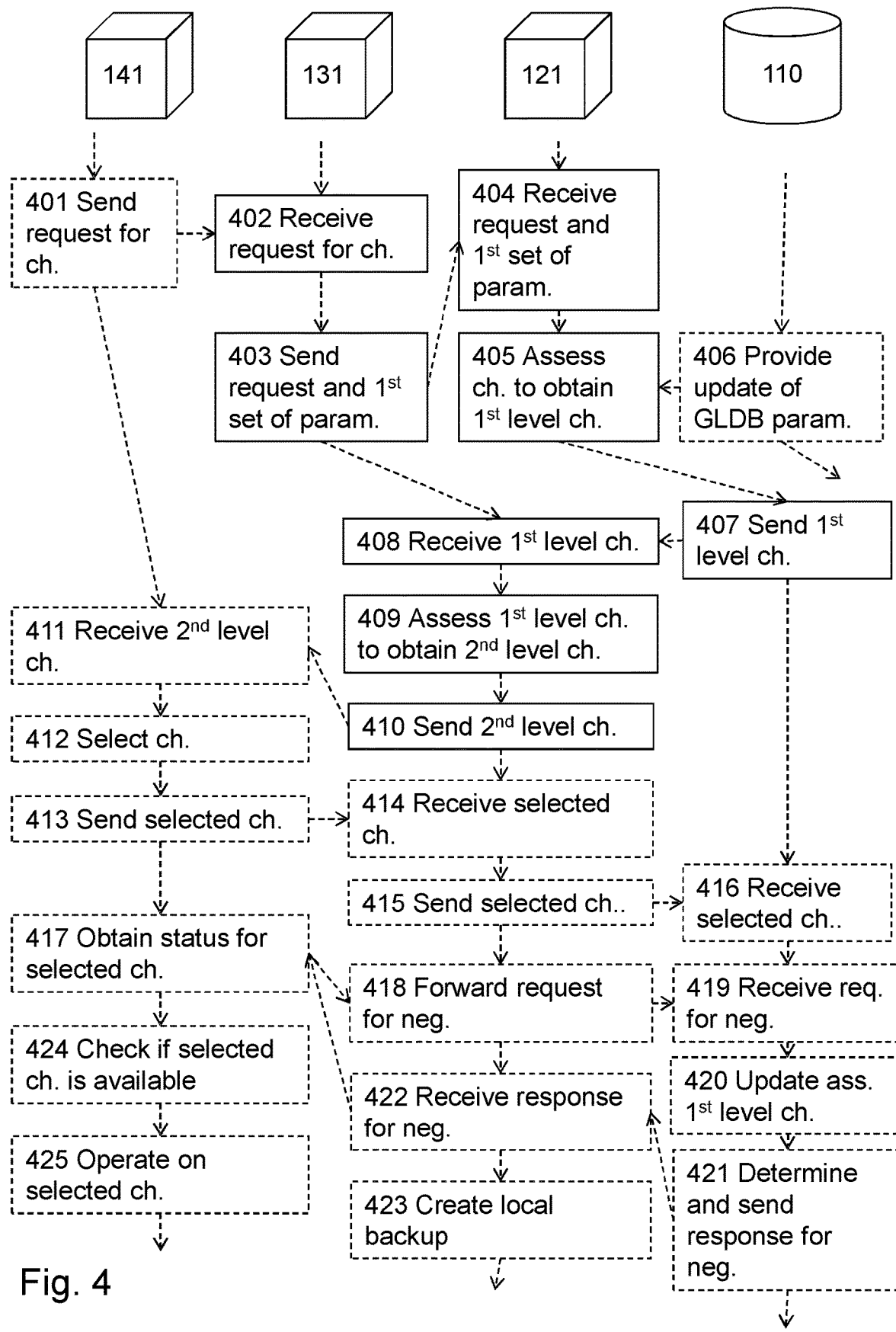
FIG. 4 is a combined signaling and flowchart illustrating the methods herein.

FIG. 4 illustrates an exemplifying method according to embodiments herein when performed in connection with the wireless communication system 100 of FIG. 2.

In the following the radio network node BS performs actions by means of the RRM module and the OCA module. Therefore, the terms RRM module and OCA module has been used here. However, it shall be understood that whenever the RRM module and/or the OCA module is referred to in a particular action below, that particular action may also be referred to as being performed by the radio network node BS. Moreover, the core network node performs actions by means of the SC module and the OCA module in the core network node. In some examples, the SC module may be configured to perform the actions performed by the OCA module. That is to say, the OCA module may be included in the SC module of the core network node 121. It is hence herein provided methods and network nodes for assessing and/or ranking channels of a radio spectrum.

One or more of following actions may be performed in any suitable order.

Action 401

The RRM module 141 sends, to the OCA module 131, a request for at least one channel. In one example, the RRM module 141 sends a request for a channel, wherein the channel may be operable by the radio network node.

Action 402

Subsequent to action 401, the OCA module 131 receives the request for the channel, or at least one channel. Channels is written as "ch." for short in the Figure.

Action 403

The OCA module 131 sends, e.g forwards, the request to the core network node 121. The request is accompanied by, or the request includes, a local set of parameters. The local set of parameters may include one or more local parameters as described further below. As an example, the local set of parameters may relate to regulatory aspects and/or performance metrics. In some examples, the set of local parameter, or the local set of parameters, relates to one or more of: throughput, bandwidth, interference, frequency, location, and the like.

Action 404

After action 403, the core network node 121 receives the request and the local set of parameters from the OCA module 131, e.g. the radio network node BS as explained above.

Action 405

The core network node 121 assesses channels, provided by the GLDB to obtain, or select, one or more channels in a first level assessment, referred to as first level channels in the Figure. The assessed channels may include a number of globally existing channels, possibly excluding channels that are not available for use. For example, a channel permanently used for emergency signaling may be excluded, a channel not allowed for security reasons in view of sensitive electronic equipment, such as in a hospital, may be excluded. See also action 4 and 5 below.

The first level assessment may refer to that a first selection of channels is chosen from among all channels provided by the GLDB.

The core network node 121 may assess the channels based on global parameters, received from the database 110, and the local set of parameters. See also the learning process below.

Action 406

This action may preferably be performed before action 405. The database 110 may provide, e.g. send to the core network node 121 either on request, without request or periodically, the globally existing channels.

Action 407

The core network node 121 sends the first level channels to the OCA module 131, included in the radio network node BS.

Action 408

Upon completion of action 407, the OCA module 131 receives the first level channels from the core network node 121, e.g. the SC, the OCA of the core network node 121 or the like.

Action 409

Following action 408, the OCA module 131 assesses the first level channels to obtain at least one second level channel, or one or more channel in a second level assessment. See also action 7 below.

In this action, the OCA module performs a second level assessment of said one or more channels of the first level assessment, i.e. the first level channels to obtain said at least one second level channel.

The second level channels are hence chosen from among the first level channels, e.g. provided by the OCA module of the core network node 121, as a result of the second level assessment.

Action 410

The OCA module 131 sends the at least one second level channel to the RRM module 141.

Action 411

Subsequent to action 410, the RRM module 141 may receive the at least one second level channel.

Action 412

Now, the RRM module 141 may select one or more channels from among the at least one second level channel, which has been recommended by the OCA module 131 in the radio network node. The radio network node has, in its turn, selected from among at least one first level channels, provided by the core network node 121.

Action 413

The radio network node may be operable on the selected one or more (at least one) channel. The RRM module 141 may send the selected one or more channels to the OCA module 131 of the radio network node.

In a first example, if the selected one or more channels are available, this action provides the OCA module with information about which channel has become unavailable due to that the RRM module 141, e.g. in the operator network 1. This example continues below.

Action 414

The OCA module 131 may receive information about the selected one or more channels.

According to the first example, this action may include that the OCA module 131 updates a model used for assessing the channels. See further details in FIG. 6 and in section "The learning process" below.

Action 415

According to the first example, the OCA module 131 may send the selected one or more channels to the core network node 121.

Action 416

Subsequent to action 415, the core network node 121 may receive the selected one or more channels from the OCA module 131. The core network node 121 may now update the database with the received information about the selected one or more channels. According to the first example, the core network node 121 may instruct the database 110 to mark the selected one or more channels as unavailable, i.e. occupied, or used by the first operator network 1 in this case.

Action 417

Now going back to the description of actions in the RRM module 141, after action 412 has been performed, the RRM module 141 may check status, e.g. available, unavailable or partly available of the selected one or more channels. In the description below, the status may be indicated by a tag associated with a respective channel.

Action 418

In a second example, when the status indicates that at least one of the selected one or more channels is partly available, the OCA module 131 may receive and send, e.g. forward, a request for negotiation from the RRM module 141 to the core network node 121. Accordingly, action 417 may include that the RRM module 141 sends the request for negotiation. The request indicates that the RRM module 141 requests a negotiation concerning the selected one or more channels. The negotiation may conclude when the channel may be used or if the channel may not be used. The negotiation is performed by the core network node 121, e.g. the SC module, while using information from the database, such as time of availability, relating to the selected one or more channels.

Action 419

Following action 419, the core network node 121 may receive the request for negotiation. See also description about negotiation below.

Action 420

The core network node 121 may update its model used for assessing first level channels based on the result of the negotiation and/or the selected one or more selected channels. See further details in FIG. 6 and in section "The learning process" below.

Action 421

Upon completion of action 419, the core network node 121 may determine a response to the request. The response may indicate, e.g. for each said one or more selected channel, whether or not the channel may be used. When indicated that a channel may be used, a condition on use of the channel may apply. The condition may specify e.g. when the channel may be used.

Action 422

The OCA module 131 may, thus, receive the response from the core network node 121. The response is then sent, by the OCA module 131, to the RRM module 141. This means that the OCA module 131 forwards the response from the core network node 121 to the RRM module 141.

According to the second example, this action may include that the OCA module 131 updates a model used for assessing the channels. See further details in FIG. 6 and in section "The learning process" below.

Action 423

The OCS module 131 may create a local backup of first level channels to be used when no first level channels are received from the core network node 121.

Action 424

The RRM module 141 may check status of the selected one or more channels.

With the first example, the status may be indicated by a respective tag of the selected one or more channels.

With the second example, the status may have been obtained by sending a request and subsequently receiving a response as in e.g. action 418. 422 etc.

Action 425

The RRM module 141 may operate on those channels of the selected one or more channels for which the status indicates that the channel is available for use by the first operator network 1.

According to the embodiments herein, the OCA modules, i.e. both in the radio network node and the core network node, may handle functionality relating to how to find available, or at least partly available channels, in a radio spectrum. The radio spectrum, or radio resource spectrum, may include one or more channels. The term "channel(s)" may herein refer to a radio frequency band, a carrier, an operational bandwidth, a radio resource being a portion of the radio spectrum being assignable to a radio network node, or an RRM module thereof.

The expression "channel operable by the radio network node" may refer to that transmission, such as radio transmission, to/from the radio network node is sent on certain time and/or frequency resources of a time-frequency structure with which the radio network node is synchronized, or at least partly synchronized on a macro and/or global level. This means for example that a time synchronization may be used when the radio network node utilizes at least a portion of a TVWS during certain hours, e.g. during day time, when a TV-broadcasting system does not utilize that portion of the TVWS.

Some example embodiments herein provide active and dynamic methods for assessing quality of spectrum resources, such as channels, taking in to account a global spectrum for an operator in a multi-operator scenario. The method comprises an Operating Channel Assessment (OCA) functionality, or OCA module, that needs to be placed in a local base station node but also in a global core network node. The OCA at both places performs assessment for every channel using a weighting or utility function that need to be determined based on global, and/or local parameters/metrics depending on the function. Both OCAs placed locally and globally will exchange information constantly to update channel information and status and learn from previous RRM channel selection.

The methods herein also describes interaction between four entities and/or functionalities: the radio resource management (RRM) module at the local base station (BS), the local OCA module at the local BS, the global OCA at the global spectrum controller (SC) and the geo-location database (GLDB) that may be somewhere in a cloud service.

In one example, a detailed procedure to classify the channels, i.e. determine a quality, or rank, for each of the channels, along with the algorithm for the handshake process during the entire channel assessment cycle and the learning process used for improving the performance of channel selection is provided.

Some embodiments herein focus on the channel quality assessment with detailed formulation procedure of assessing frequency channels based on different metrics, a learning process is also introduced to improve the assessment over time. In addition, the architectural split of a local and global OCA, while each using different metrics for channel evaluation and investigating the advantages like computational power savings with such architecture is also presented in at least some embodiments herein.

According to the embodiments herein, there is provided an active, centralized and global spectrum management as well as an internal (within an operators network) assessment of performance of the available spectrum resources, aka channels.

Furthermore, an RRM decision is advantageously improved by giving to the RRM module, information of the channels in a clear format Moreover, an advantage is that a standardized interface between the global data base, the spectrum controller and the routing functionality, i.e. the RRM, may allow multi-vendor interworking.

Figure 5:
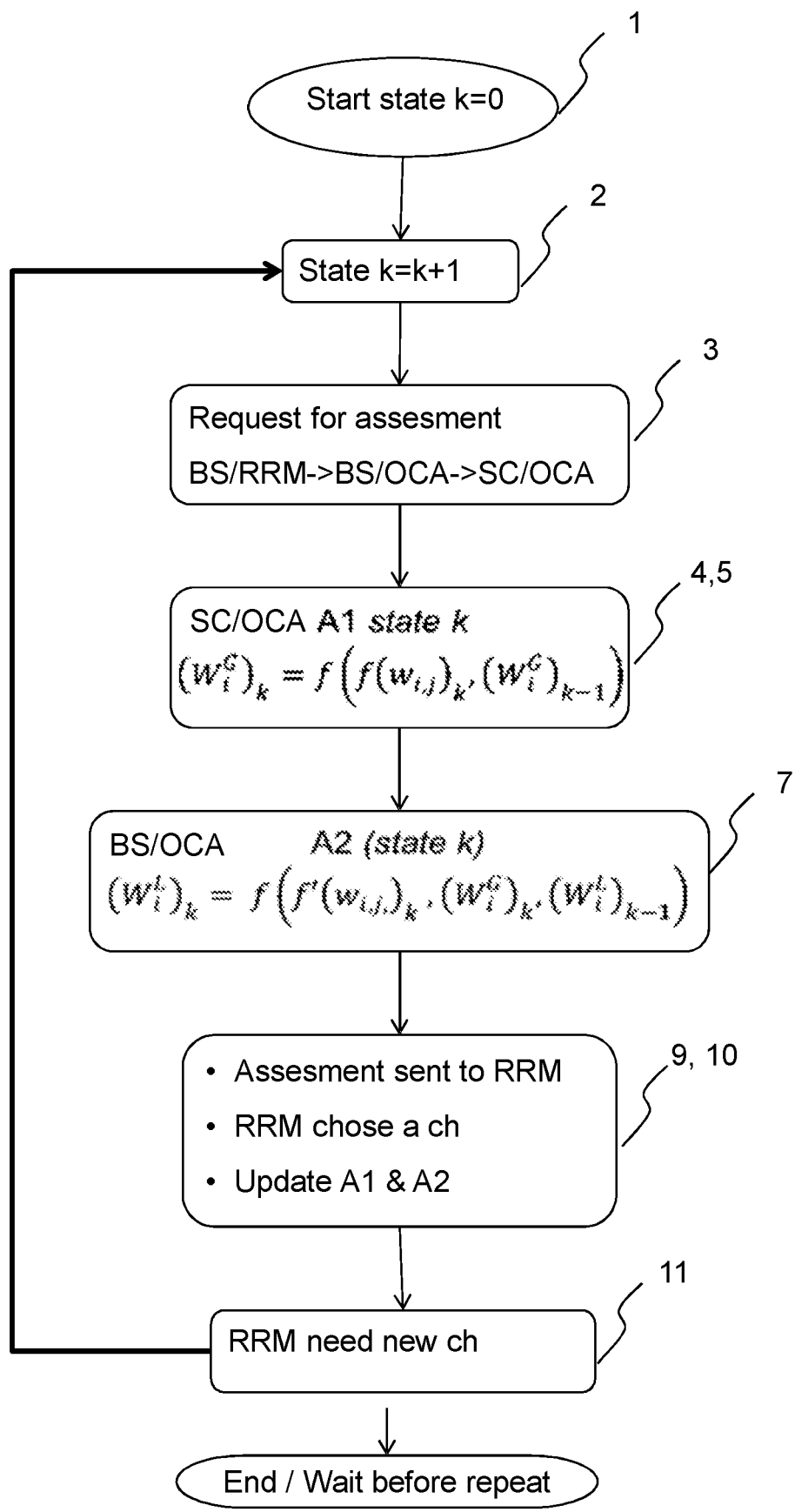
FIG. 5 is a flowchart according an embodiment herein.

Now providing with reference to FIG. 5, further details on how the models for assessing channels may be actively and dynamically updated based on current selection of channel using a learning algorithm.

Following is the proposed algorithm for managing the channel assessment, e.g. how to find the operating channel by assessment and ranking.
1. RRM starts for the first time, request or state k=0
2. State k=k+1, BS/RRM ask for channel assessment to BS/OCA. See e.g. action 401.
3. BS/OCA request channel assessment to SC in core network, sending local parameters like location, operation frequencies, etc. See e.g. action 403 and 404.
4. SC/OCA, e.g. the core network node, update information, e.g. sync with GLDB if needed, if this information has not recently been updated. See e.g. action 406.
5. SC/OCA rank spectrum bands, e.g. channels, according input local-parameters and global-parameters like spectrum sharing and availability. See e.g. action 405.
   a. For every frequency, $f_i$, assign a weighting value, $w_{i,j}$, according a parameter $p_j$, using $(W_i^G)_k = h(f_j(w_{i,j})_k, (W_i^G)_{k-1})$ (learning)
6. The SC sends information about the ranking, also referred to as quality or quality measure herein, of the channels to BS/OCA. See e.g. action 407 and 408.
7. BS/OCA performs second level of channel assessment using other local-parameters (related to service based KPIs, e.g., throughput). See action 409.
   a. For every frequency, $f_i$, assign a weighting value, $w_{i,j}$, according a parameter $p_j$ using $w_{i,j}^L = f_j(f_i, p_j)$
   b. Complete BS/OCA assessment in current state k considering assessment in previous state k−1 as:
      $(W_i^L)_k = h(f_j(w_{i,j})_k, (W_i^G)_k, (W_i^L)_{k-1})$ (learning)
8. BS/OCA tag the channels, cmp with status in FIG. 4, as:
   a. Available if $W_i \geq \beta_1$
   b. Partially available can be negotiated
   c. Unavailable if $W_i \leq \beta_1$
9. BS/OCA send to BS/RRM the available and partially available channels, ranked according to their weights. See action 410.
10. BS/RRM improves, e.g. optimizes, and chooses a channel, e.g. at least one channel. See action 412.
    a. If the channel is tagged available, cmp. first example in FIG. 4, then start to feedback information upwards (learning):
       1. BS/RRM inform to BS/OCA. See action 413 and 414.
       2. BS/OCA inform to SC/OCA. See action 415 and 416.
       3. SC/OCA update info, END
       4. BS/RMM start to transmit on channel. See action 425.
    b. Else, best channel is tagged partially available, cmp. second example in FIG. 4,
       1. Use the first channel that is tagged available
       2. BS/RRM request to BS/OCA negotiate the channel. See action 417 and 418.
       3. BS/OCA request to SC/OCA negotiate the channel See action 418.
       4. SC/OCA negotiate channel, See action 419 and 421.
          i. If channel is successfully negotiated, inform backwards and go to 10.a
          ii. Otherwise, inform backwards
             1. BS/OCA tag the channel as unavailable and inform BS/RRM (learning)
             2. BS/RRM remove channel from the list
             3. BS/RRM decide if stay on the channel chosen in 10.b.1
                a. If yes, go to 10.a
                b. If no, go to 11
11. RRM need to change channel, go to 2.

Figure 6:
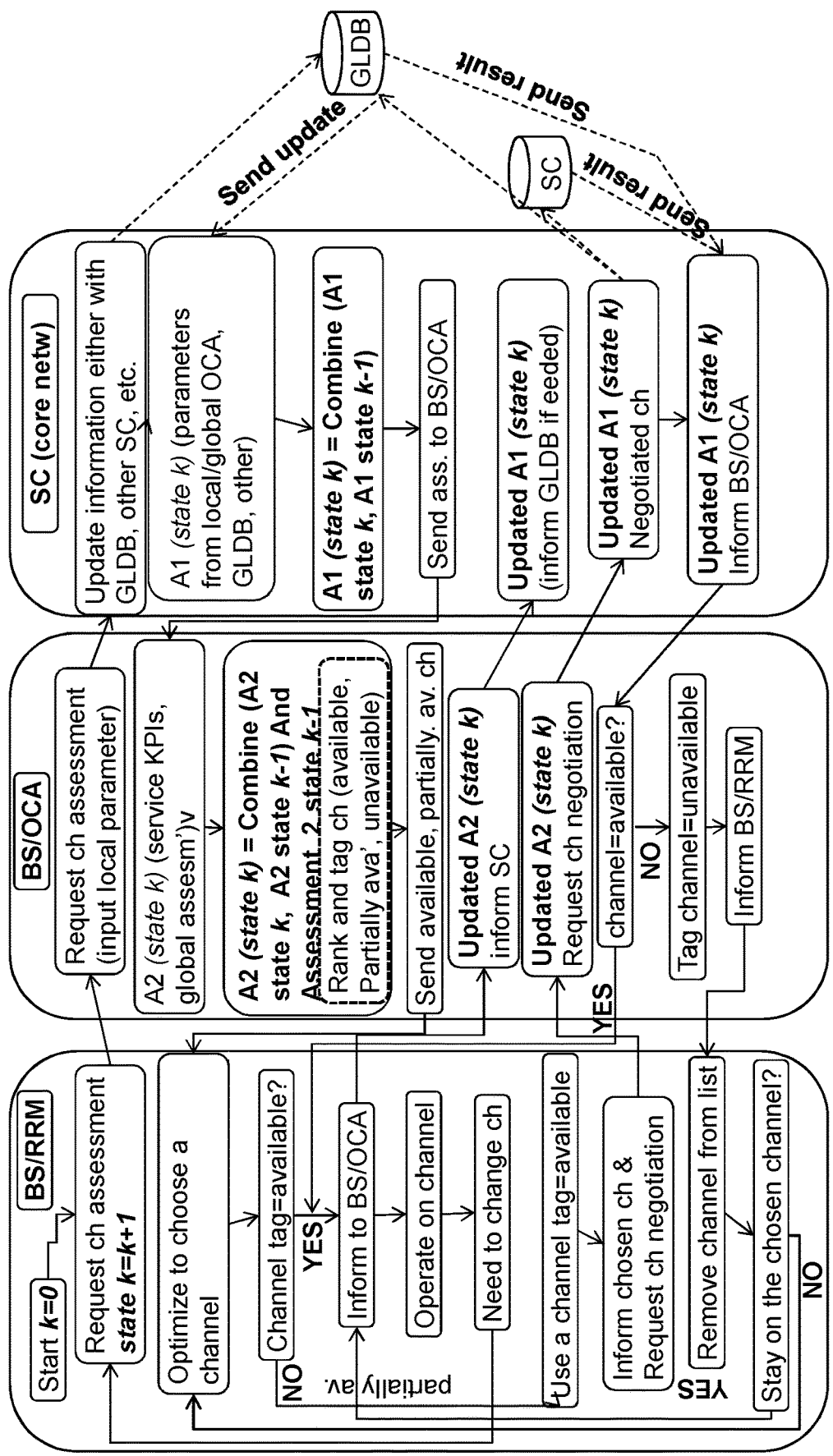
FIG. 6 is a combined signaling and flowchart illustrating an exemplifying method.

A data flow during a handshake process between the RRM, local OCA and the global OCA is described in the following. Hence, FIG. 6 represents the flow chart for the proposed algorithm. This means that FIG. 6 shows a flow illustrating the information flow in the system 100. The instructions in bold represent steps where the BS/OCA or SC/OCA learn from each other and this information can be saved to enhance next assessment. The dash lines means this signaling is not mandatory.

Initially, see also action 401, the channel assessment request comes from the RRM to the local BS/OCA. In doing so the local service specific KPIs, referred to as the local set of parameters in action 403, are also communicated with the local BS/OCA. The BS/OCA then requests channel assessment, see action 403 as well, from the SC/OCA, based on specific parameters (i.e. the KPIs). In this handshake process, the local system specific information like for example: the location, system ID and operating frequencies are conveyed to the SC/OCA. Using this information the SC/OCA start the channel assessment, see action 405, and may initiate a handshake process with the GLDB, see database 110, for channel specific information and updates.

The channel information handled by the GLDB may change very slow compare with the time RRM need assessment, then another possibility is that SC/OCA do not request information about channel every time a request from RRM is coming, but instead either SC/OCA update now and then, i.e. hours, days or weeks basis, or the GLDB is the one that inform the SC/OCA's if any change in the channel information. See action 406.

Thereafter, the channel assessment is completed in the SC/OCA (global level) and the assessment details along with a ranked list of all the channels are sent to the BS/OCA. See action 407. After the BS/OCA receives the ranked list of channels, it does a further assessment of those channels, taking into account the service specific KPIs and local conditions. See action 409. These KPIs could include e.g. throughput requirements, delay, latency, system bandwidth, among others. After this re-assessment, the channels are ranked again and tagged as available, partially available and unavailable. The ranked available and partially available, list of channels will then be communicated, see action 410, to the BS/RRM, which chooses one of the best channels after an improvement process, e.g. the best channel after an optimization process.

After the BS/RRM performs a selection to choose a channel and find that the channel is previously tagged as available for the BS/OCA, then it chooses the channel and informs the local BS/OCA which further informs the SC/OCA where the status of that specific channel is updated accordingly. See action 412 and 413. Therefore, this flow of data also enables learning of channel specific information being used for a specific scenario in a system by a particular operator.

If the channel is not tagged as available for a particular operation, the BS/RRM in parallel start to operate in a suboptimal channel, such as a channel ranked with a lower quality than the channel with the highest quality, which suboptimal channel is tagged available. The BS/RRM then sends a negotiation request, which request concerns the availability of a channel ranked higher than the suboptimal channel, to the local BS/OCA which is then forwarded to the SC/OCA. See e.g. action 417, 418 and 419. On receiving this information, the SC/OCA initiates a handshake process with another entity (BS/OCA, SC, GLDB). See e.g. action 420 and 421. This is related to action 419 above. Thereafter, two cases arise:

In the first case, if the channel is positively negotiated (e.g. the channel is tagged as available after negotiation), the channel becomes available and this information is then forwarded to the local BS/OCA and then to the BS/RRM which can then choose to switch to this newly available channel for operation and finally conveys this information to the BS/OCA which further transfers this information to the SC/OCA to complete the learning process.

If the channel negotiation fails, then this information is again sent to the local BS/OCA and then to BS/RRM, and the channel should be removed from the list. The BS/RRM would consider the second best channel and then start checking for its availability and carry out the same process as discussed earlier.

The Learning Process

Let n be the number of channels that the global spectrum controller handles. Assume the system starts in the state k where k=1. Then the first assessment (A1 or Assessment_1) is done at the global SC/OCA by using $$(W_i^G)_k = h(f_j(w_{i,j})_k, (W_i^G)_{k-1})$$ Eq. 4 where $f_j(w_{i,j})_k$ is the global assessment, e.g. the model used for assessing the channels, in the current state k using global parameters, and $(W_i^G)_{k-1}$ is the previous global assessment in state k−1

The second assessment (A2 or Assessment_2) will be then done at the local BS/OCA by using $$(W_i^L)_k = h(f'_j(w_{i,j})_k, (W_i^G)_k, (W_i^L)_{k-1})$$ Eq. 5

Wherein $(W_i^G)_k$ is the result of the global assessment (A1), $f'_j(w_{i,j})_k$ is the local assessment, e.g. the model used for assessing the channels, considering the KPIs in the current state k, and $(W_i^L)_{k-1}$ is the previous local assessment in state k−1

When the assessment is done for the first time there is no previous assessment implying that $(W_i^L)_{k-1}$ and $(W_i^G)_{k-1}$ do not exist, and hence not considered.

An example of how the h(*) function at the global or local can be seen is as the average of the weight value of the highest ranked frequency channel and the weight of the chosen channel.

Local and Global OCA, e.g. the OCA Module in the Radio Network Node and the OCA Module in the Core Network Node The motivation behind having a local and global OCA, i.e. the BS/OCA and the core network node, is to:

1. Layer and separate the channel, e.g. frequency band, assessment according relevant metric for the local and global environments. For example, the global SC would perform the frequency assessment based on global metric for example, the regulatory conditions, channel sharing efficiency and availability. It would then rank the frequency bands according to the assessment weights and then send to the local OCA for further assessment based on the local key performance metrics (KPIs).
2. The global SC should not get flooded with all the local information of all active systems and the local OCA should not get flooded with all the frequency channel/band information available in the GLDB which could save a lot of processing in both the nodes.

3. Create a local backup solution in case global OCA in the SC crash (or vice versa), then the local OCA will be able to assess channels based on previous knowledge store, e.g. last known values (parameters) sent from global OCA.

The local assessment of a channel will always overrule the global assessment.

Example of Key Parameter Used for the Assessment

The following table presents a list of parameters that may be of relevance in order to assess the channel. The local parameters may be used e.g. in action 409. The global parameters may be used in action 405.

|  | Local parameters ||| Global parameters |||
|---|---|---|---|---|---|---|
| Parameter | Licensed | Unlic. | Primary sharing | Licensed | Unlic. | Primary sharing |
| Frequencies | x | x | x | x | x | x |
| Location | x | x | x | x | x | x |
| Spectrum sharing |  | x | x |  | x | x |
| Spectrum availability |  | x | x |  | x | x |
| Throughput | x | x | x |  |  |  |
| Bandwidth | x | x | x |  |  |  |
| Interference |  | x | x |  |  |  |

Example of functions that can be used for the assessment of the channels.

Frequency: the band/channel frequency $$w_{i,j} = \begin{cases} 0, & \text{if frequency is possible to operate on} \\ 1, & \text{Otherwise} \end{cases}$$

Bandwidth: The bandwidth (BW) is here defined as the width of a given channel. If bandwidth $BW_i$ is the parameter $p_j$, one way the local BS/OCA can assigns the weighting value is according to:

$$w_{i,j} = \begin{cases} 1, & \text{if } \frac{BW_i}{BW_{min}} \geq 1 \\ \frac{BW_i}{BW_{min}}, & \text{if } \frac{BW_i}{BW_{min}} < 1 \end{cases}$$

Where $BW_{min}$ is the minimum bandwidth required in order to fulfill the minimum data rate requirement for a given service.

Throughput: The expected throughput of the assessing system is a relevant parameter to assess. It reflects whether a particular service may be provided using the channel or not. If expected throughput is the parameter $p_j$, the local OCA assigns the weighting value according to:

$$w_{i,j} = \begin{cases} 1, & \text{if } \frac{\lambda_i}{\lambda_{min}} \geq 1 \\ \frac{\lambda_i}{\lambda_{min}}, & \text{if } \frac{\lambda_i}{\lambda_{min}} < 1 \end{cases} \quad \text{Eq. 10}$$

Spectrum sharing efficiency, SSE: refers to the percentage of the whole band which could be shared over time. Then assuming that SSE is the parameter $p_j$, for a given frequency, $f_i$, the weighting value is:

$$w_{i,j} \in \begin{cases} \{1\}, & \text{when } f_i \text{ is licensed spectrum} \\ \left[\frac{1}{Nop+1}, 1\right], & \text{when } f_i \text{ is unlicensed spectrum} \\ \left[\frac{1}{Nop+1}, 1\right], & \text{when } f_i \text{ is primary sharing spectrum} \end{cases}$$

Spectrum availability: will keep track on how available a frequency band is. This metric will be evaluated both in the global as well as in the local setting, since the assessment may differ depending on location and time.

Then assuming that spectrum availability is the parameter $p_j$, for a given frequency, $f_i$, the weighting value is:

$$w_{i,j} \in \begin{cases} \{1\}, & \text{when } f_i \text{ is licensed spectrum} \\ \{0, 1\}, & \text{when } f_i \text{ is unlicensed spectrum} \\ \{0, 1\} & \text{when } f_i \text{ is primary sharing spectrum} \end{cases},$$

Figure 7:
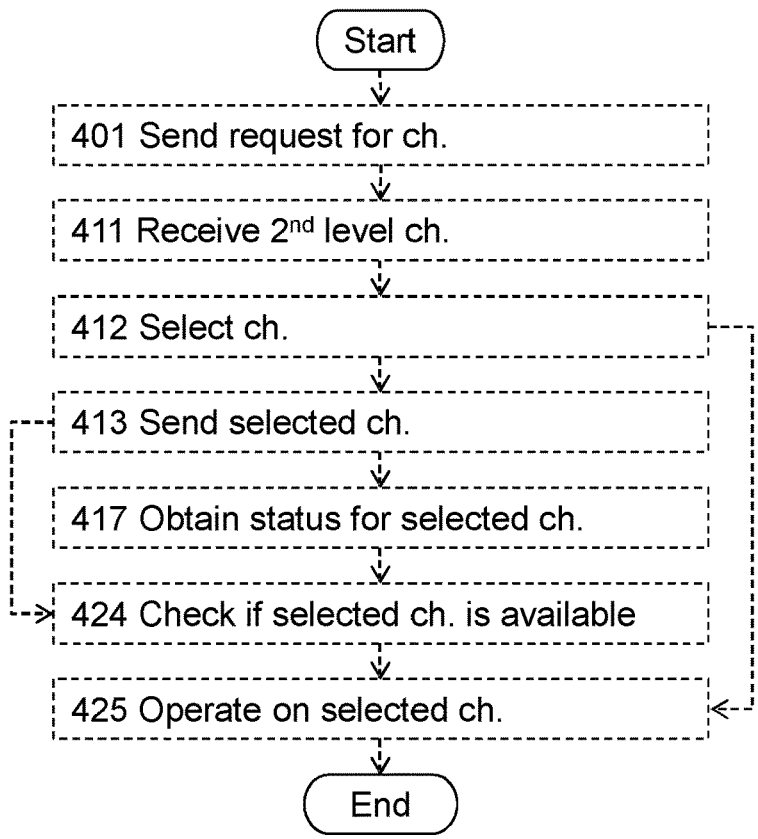
FIG. 7 is a flowchart illustrating an exemplifying method in an RRM of the radio network node.

In FIG. 7, an exemplifying, schematic flowchart of the method in the RRM module is shown. The same reference numerals as used in connection with FIG. 4 have been applied to denote the same or similar actions.

The following actions may be performed in any suitable order. Reference is made to the flowchart of the Figure.

Figure 8:
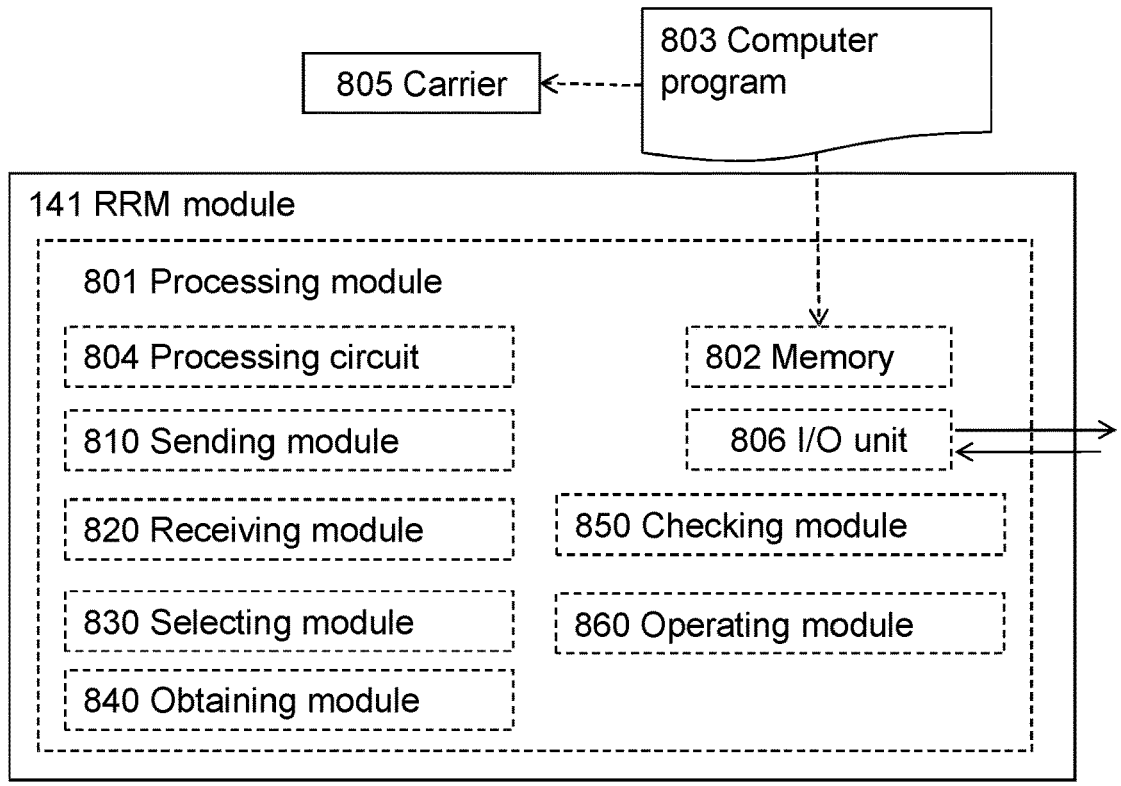
FIG. 8 is a block diagram illustrating an exemplifying RRM module.

With reference to FIG. 8, a schematic block diagram of embodiments of the RRM module of FIG. 2 is shown.

The RRM module 141 may comprise a processing module 801, such as a means, one or more hardware modules and/or one or more software modules for performing the methods described herein.

The RRM module 141 may further comprise a memory 802. The memory may comprise, such as contain or store, a computer program 803.

According to some embodiments herein, the processing module 801 comprises, e.g. 'is embodied in the form of' or 'realized by', a processing circuit 804 as an exemplifying hardware module. In these embodiments, the memory 802 may comprise the computer program 803, comprising computer readable code units executable by the processing circuit 804, whereby the RRM module 141 is operative to perform the methods of FIG. 4 and/or FIG. 7.

In some other embodiments, the computer readable code units may cause the RRM module 141 to perform the method according to FIGS. 4 and/or 7 when the computer readable code units are executed by the RRM module 141.

FIG. 8 further illustrates a carrier 805, comprising the computer program 803 as described directly above. The carrier 805 may be one of an electronic signal, an optical signal, a radio signal, and a computer readable medium.

In some embodiments, the processing module 801 comprises an Input/Output unit 806, which may be exemplified by a receiving module and/or a sending module as described below when applicable.

In further embodiments, the processing module 801 may comprise one or more of a sending module 810, a receiving module 820, a selecting module 830, an obtaining module 840, a checking module 850 and an operating module 860 as exemplifying hardware modules. In other examples, one or more of the aforementioned exemplifying hardware modules may be implemented as one or more software modules.

Therefore, according to the various embodiments described above, the RRM module 141, the processing module 801 and/or any one of the aforementioned modules may be operative to, such as configured to perform one or more of the actions of FIG. 7.

Figure 9:
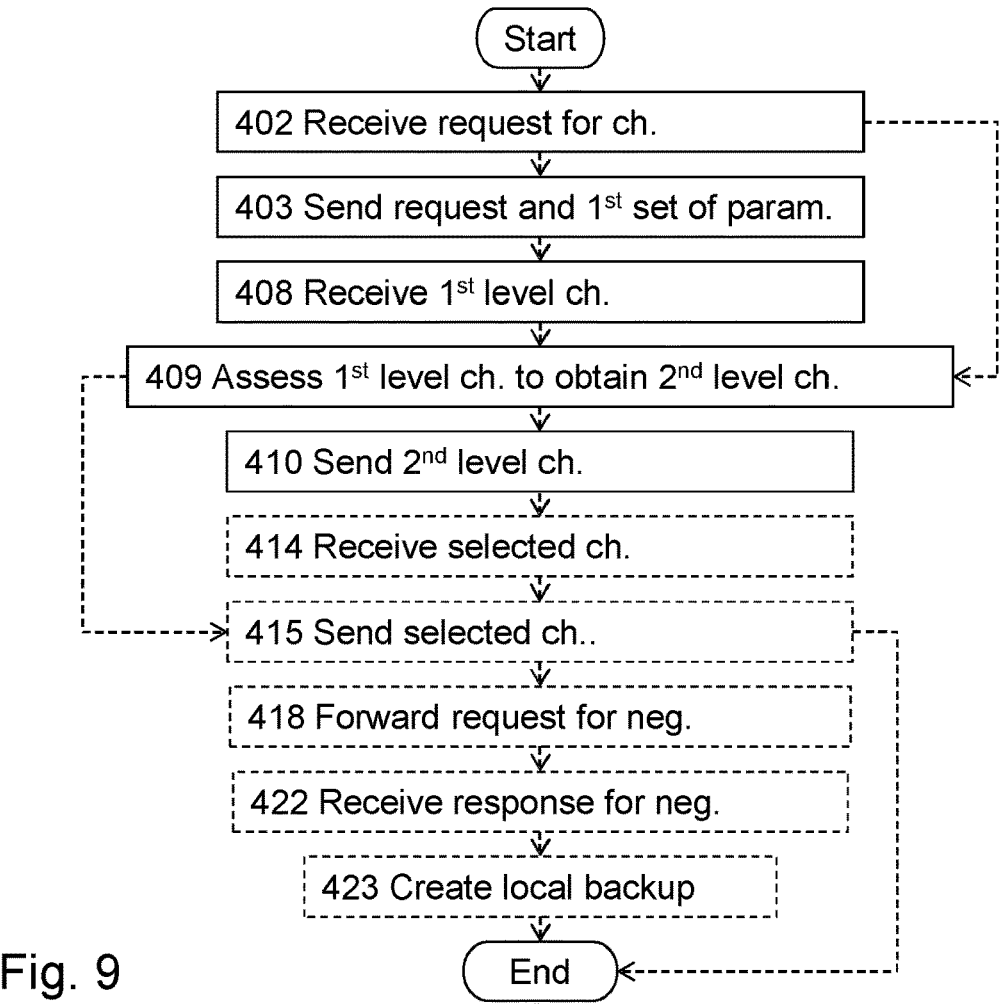
FIG. 9 is a flowchart illustrating embodiments of the method in the OCA module of the radio network node.

In FIG. 9, an exemplifying, schematic flowchart of the method in the OCA module is shown. The same reference numerals as used in connection with FIG. 4 have been applied to denote the same or similar actions. Hence, the OCA module 131 of the radio network node performs a method for handling a request for at least one channel.

The following actions may be performed in any suitable order. Reference is made to the flowchart of the Figure.

Action 402

The OCA module 131 receives, from an Radio Resource Management "RRM" module of the radio network node BS, the request for the at least one channel.

Action 403

The OCA module 131 sends the request and a set of local parameters, wherein the set of local parameters relates to one or more of: throughput, bandwidth, interference, frequency, location and the like.

The throughput, the bandwidth, the frequencies and/or the location may apply for licensed channels, unlicensed channels and channels under primary sharing, and/or the interference may apply for unlicensed channels and channels under primary sharing.

Action 408

The OCA module 131 receives, from the core network node 121, one or more channels in a first level assessment.

Action 409

The OCA module 131 assesses, in a second level assessment, said one or more channels in the first level assessment, to obtain at least one second level channel.

The assessing of said one or more channels in the first level assessment to obtain the second level channels may be performed by considering a previous second level channel assessment, thereby learning from the previous second level channel assessment.

Action 410

The OCA module 131 sends said at least one second level channel to the RRM module.

Action 414

The OCA module 131 may receive, from the RRM module, information about a selected one or more channels, wherein a model used for the second level assessment is updated based on the information.

Action 423

The OCS module 131 may create a local backup of first level channels to be used when no first level channels are received from the core network node 121.

Figure 10:
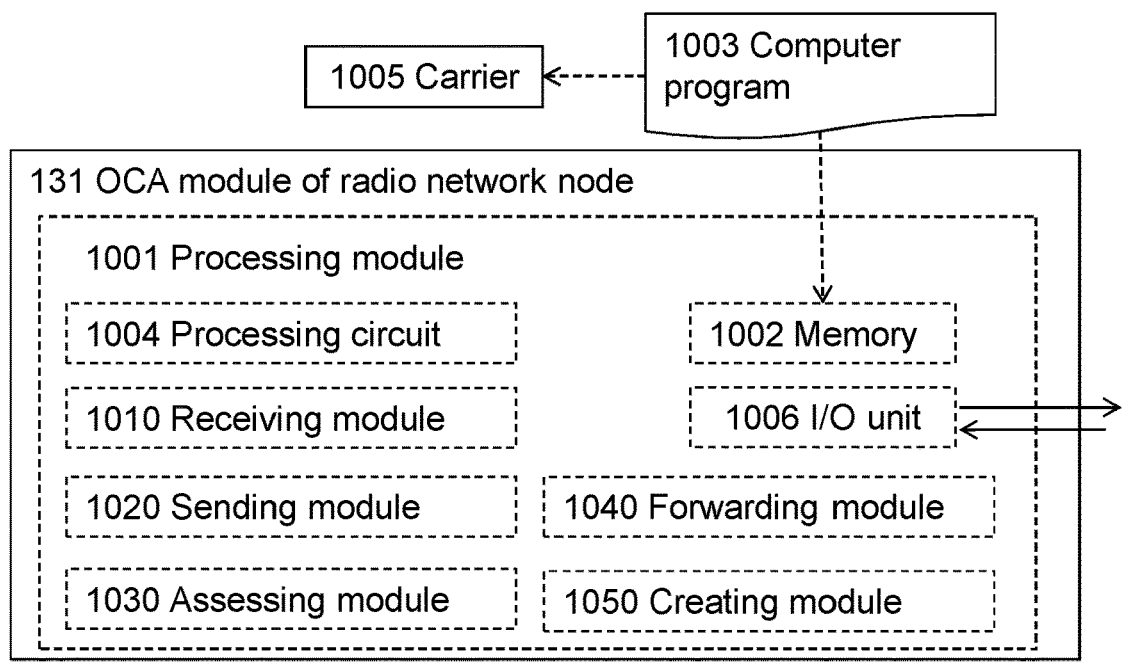
FIG. 10 is a block diagram illustrating embodiments of the OCA module of the radio network node.

With reference to FIG. 10, a schematic block diagram of embodiments of the OCA module 131 of the radio network node BS of FIG. 2 is shown.

The OCA module 131 may comprise a processing module 1001, such as a means, one or more hardware modules and/or one or more software modules for performing the methods described herein.

The OCA module 131 may further comprise a memory 1002. The memory may comprise, such as contain or store, a computer program 1003.

According to some embodiments herein, the processing module 1001 comprises, e.g. 'is embodied in the form of' or 'realized by', a processing circuit 1004 as an exemplifying hardware module. In these embodiments, the memory 1002 may comprise the computer program 1003, comprising computer readable code units executable by the processing circuit 1004, whereby the OCA module 131 is operative to perform the methods of FIG. 4 and/or FIG. 9.

In some other embodiments, the computer readable code units may cause the OCA module 131 to perform the method according to FIGS. 4 and/or 9 when the computer readable code units are executed by the OCA module 131.

FIG. 10 further illustrates a carrier 1005, comprising the computer program 1003 as described directly above. The carrier 1005 may be one of an electronic signal, an optical signal, a radio signal, and a computer readable medium.

In some embodiments, the processing module 1001 comprises an Input/Output unit 1006, which may be exemplified by a receiving module and/or a sending module as described below when applicable.

In further embodiments, the processing module 1001 may comprise one or more of a receiving module 1010, a sending module 1020, an assessing module 1030, a forwarding module 1040 and a creating module 1050 as exemplifying hardware modules. In other examples, one or more of the aforementioned exemplifying hardware modules may be implemented as one or more software modules.

Therefore, according to the various embodiments described above, the OCA module 131, the processing module 1001 and/or any one of the aforementioned modules may be operative to, such as configured to perform one or more of the actions of FIG. 9. Hence, there is provided an OCA module 131 of the radio network node BS, for handling a request for at least one channel.

The OCA module 131, the processing module 1001 and/or the receiving module 1010 is configured for receiving, from a Radio Resource Management "RRM" module of the radio network node BS, the request for the at least one channel.

The OCA module 131, the processing module 1001 and/or the sending module 1020 is configured for sending the request and a set of local parameters, wherein the set of local parameters relates to one or more of: throughput, bandwidth, interference, frequency, location and the like.

The throughput, the bandwidth, the frequencies and/or the location may apply for licensed channels, unlicensed channels and channels under primary sharing, and/or the interference may apply for unlicensed channels and channels under primary sharing.

Moreover, the OCA module 131, the processing module 1001 and/or the receiving module 1010, or another receiving module (not shown), is configured for receiving, from the core network node 121, one or more channels in a first level assessment.

The OCA module 131, the processing module 1001 and/or the assessing module 1030 is configured for assessing, in a second level assessment, said one or more channels in the first level assessment, to obtain at least one second level channel.

Furthermore, the OCA module 131, the processing module 1001 and/or the sending module 1020 is configured for sending said at least one second level channel to the RRM module.

The OCA module 131, the processing module 1001 and/or the receiving module 1010, or a further receiving module (not shown), may be configured for receiving, from the RRM module, information about a selected one or more channels, wherein a model used for the second level assessment is updated based on the information.

The OCA module 131, the processing module 1001 and/or the assessing module 1030 may be configured for assessing of said one or more channels in the first level assessment to obtain the second level channels by considering a previous second level channel assessment, thereby learning from the previous second level channel assessment.

The OCA module 131, the processing module 1001 and/or the creating module 1050 may be configured for creating a local backup of first level channels to be used when no first level channels are received from the core network node 121.

Figure 11:
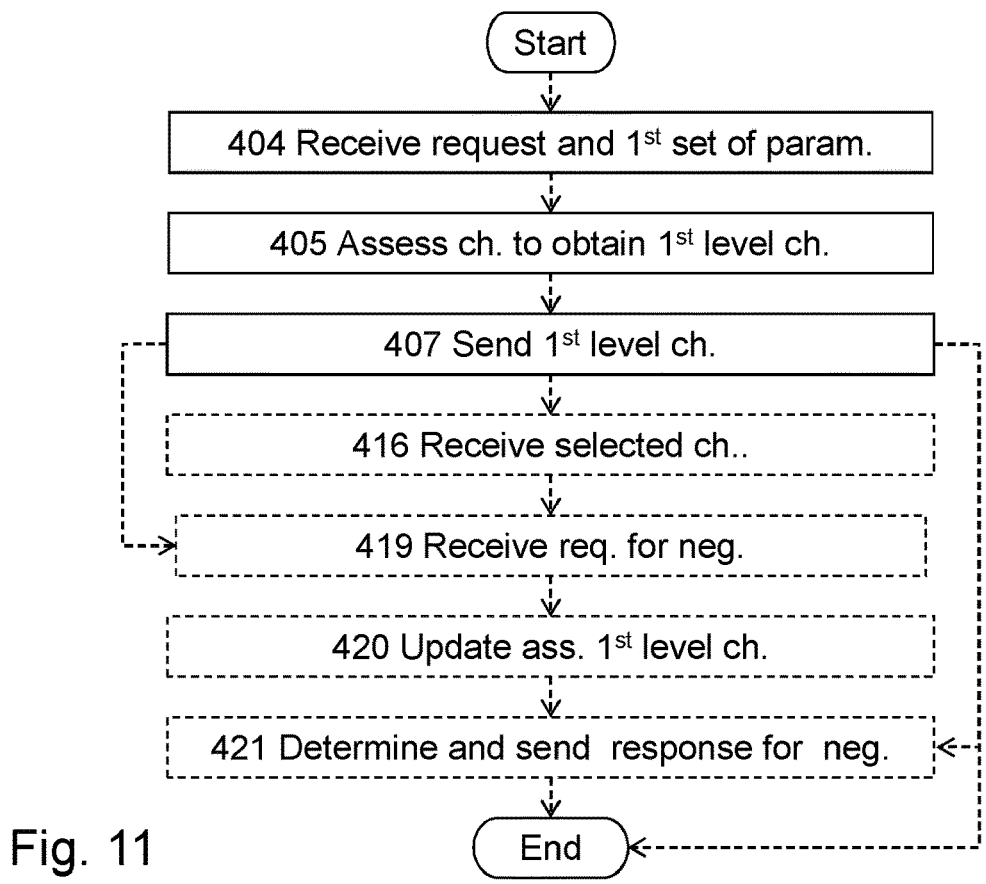
FIG. 11 is a flowchart illustrating embodiments of the method in the OCA module of the core network node.

In FIG. 11, an exemplifying, schematic flowchart of the method in the core network node 121 is shown. The same reference numerals as used in connection with FIG. 4 have been applied to denote the same or similar actions. Accordingly, the OCA module of the core network node 121 performs a method for providing at least one channel operable by a radio network node BS.

The following actions may be performed in any suitable order. Reference is made to the flowchart of the Figure.

Action 404

The OCA module of the core network node 121 receives, from an OCA module of the radio network node BS, a request for the at least one channel, and a set of local parameters, wherein the set of local parameters relates to one or more of: throughput, bandwidth, interference, frequency, location and the like.

Action 405

The OCA module of the core network node 121 assesses channels, provided by a Global Location database, to select one or more channels in a first level assessment, wherein the assessment is based on the set of local parameters and a set of global parameters, wherein the set of global parameters relates to one or more of: frequency, location, spectrum sharing, spectrum availability and the like.

The assessing of the channels to select one or more channels in the first level assessment may be performed by considering a previous first level channel assessment, thereby learning from the previous first level channel assessment.

The throughput, the bandwidth, the frequencies and/or the location may apply for licensed channels, unlicensed channels and channels under primary sharing, and/or the interference, the spectrum sharing and the spectrum availability may apply for unlicensed channels and channels under primary sharing.

Action 407

The OCA module of the core network node 121 sends the first level channels to the OCA module of the radio network node BS.

Action 416

The OCA module of the core network node 121 may receive, from the OCA module (131) of the radio network node (BS), a selected one or more channels.

Action 420

The OCA module of the core network node 121 may update a model used for the first level assessment based on the selected one or more channels.

Figure 12:
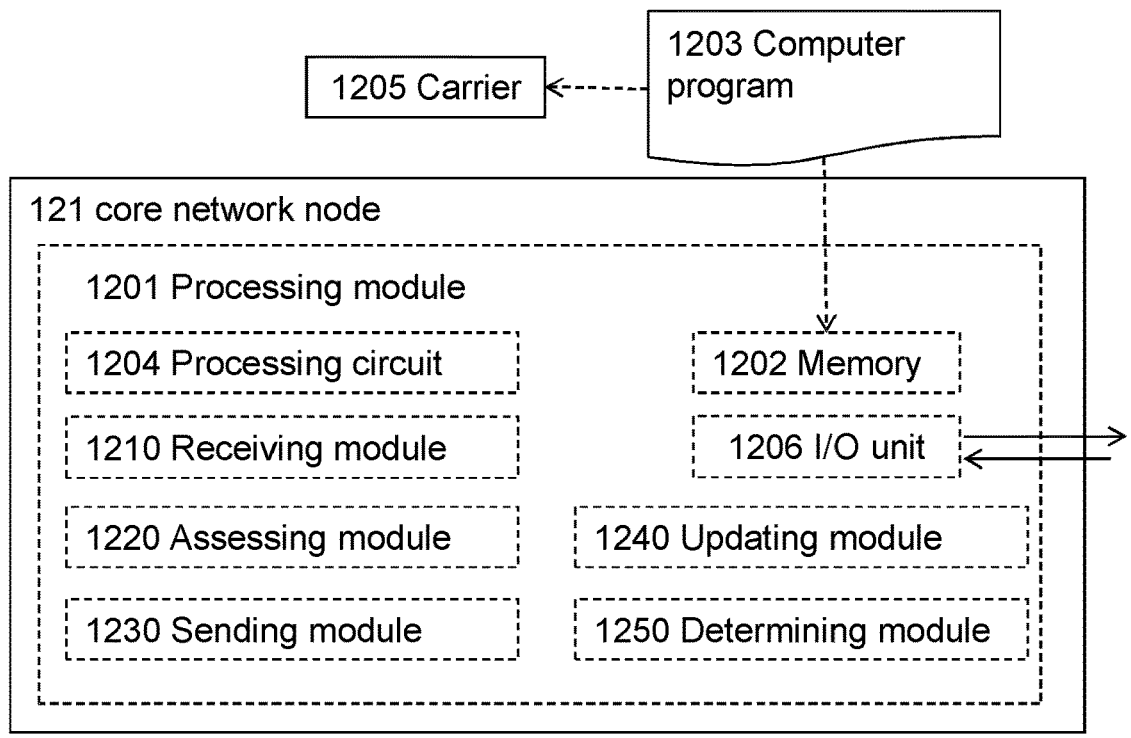
FIG. 12 is a block diagram illustrating embodiments of the OCA module of the core network node.

With reference to FIG. 12, a schematic block diagram of embodiments of the core network node 121 of FIG. 2 is shown.

The core network node 121 may comprise a processing module 1201, such as a means, one or more hardware modules and/or one or more software modules for performing the methods described herein.

The core network node 121 may further comprise a memory 1202. The memory may comprise, such as contain or store, a computer program 1203.

According to some embodiments herein, the processing module 1201 comprises, e.g. 'is embodied in the form of' or 'realized by', a processing circuit 1204 as an exemplifying hardware module. In these embodiments, the memory 1202 may comprise the computer program 1203, comprising computer readable code units executable by the processing circuit 1204, whereby the core network node 121 is operative to perform the methods of FIG. 4 and/or FIG. 11.

In some other embodiments, the computer readable code units may cause the core network node 121 to perform the method according to FIGS. 4 and/or 11 when the computer readable code units are executed by the core network node 121.

FIG. 12 further illustrates a carrier 1205, comprising the computer program 1203 as described directly above. The carrier 1205 may be one of an electronic signal, an optical signal, a radio signal, and a computer readable medium.

In some embodiments, the processing module 1201 comprises an Input/Output unit 1206, which may be exemplified by a receiving module and/or a sending module as described below when applicable.

In further embodiments, the processing module 1201 may comprise one or more of a receiving module 1210, an assessing module 1220, a sending module 1230, an updating module 1240 and a determining module 1250 as exemplifying hardware modules. In other examples, one or more of the aforementioned exemplifying hardware modules may be implemented as one or more software modules.

Therefore, according to the various embodiments described above, the core network node 121, the processing module 1201 and/or any one of the aforementioned modules may be operative to, such as configured to perform one or more of the actions of FIG. 11. Hence, an OCA module of the core network node 121 configured for providing at least one channel operable by a radio network node BS is provided.

The OCA module of the core network node 121, the processing module 1201 and/or the receiving module 1210 is configured for receiving, from an OCA module 131 of the radio network node BS, a request for the at least one channel, and a set of local parameters, wherein the set of local parameters relates to one or more of: throughput, bandwidth, interference, frequency, location and the like.

The OCA module of the core network node 121, the processing module 1201 and/or the assessing module 1220 is configured for assessing channels, provided by a Global Location database, to select one or more channels in a first level assessment, wherein the assessment is based on the set of local parameters and a set of global parameters, wherein the set of global parameters relates to one or more of: frequency, location, spectrum sharing, spectrum availability and the like.

The throughput, the bandwidth, the frequencies and/or the location may apply for licensed channels, unlicensed channels and channels under primary sharing, and/or the interference, the spectrum sharing and the spectrum availability may apply for unlicensed channels and channels under primary sharing.

The OCA module of the core network node 121, the processing module 1201 and/or the sending module 1230 is configured for sending the first level channels to the OCA module of the radio network node BS.

The OCA module of the core network node 121, the processing module 1201 and/or the receiving module 1210, or another receiving module (not shown), may be configured for receiving 416, from the OCA module 131 of the radio network node BS, a selected one or more channels.

The OCA module of the core network node 121, the processing module 1201 and/or the updating module 1240 may be configured for updating a model used for the first level assessment based on the selected one or more channels.

The OCA module of the core network node 121, the processing module 1201 and/or the assessing module 1220 may be configured for assessing of the channels to select one or more channels in the first level assessment by considering a previous first level channel assessment, thereby learning from the previous first level channel assessment.

As used herein, the term "wireless device" and/or "user equipment" may refer to a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a machine-to-machine (M2M) device, a sensor device equipped with radio communication capabilities or the like. The sensor may be any kind of weather sensor, such as wind, temperature, air pressure, humidity etc. As further examples, the sensor may be a light sensor, an electronic or electric switch, a microphone, a loudspeaker, a camera sensor etc. The term "user" may indirectly refer to the wireless device.

As used herein, the term "node" may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments are implemented in a distributed manner.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a bit string.

As used herein, the term "set of", such as set of devices, may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a first processing circuit of a radio network node (BS), for handling a request for at least one channel, wherein the method comprises:
   receiving, from a second processing circuit of the radio network node (BS), the request for the at least one channel;
   sending, to a core network node, the request, wherein the request comprises a set of local parameters, and wherein the set of local parameters relates to one or more of:
   throughput,
   bandwidth,
   interference,
   frequency, and
   location;

receiving, from the core network node, one or more first level channels in a first level assessment;

assessing using the set of local parameters, in a second level assessment, said one or more first level channels received in the first level assessment, wherein the assessing, in the second level assessment, of said one or more first level channels received in the first level assessment comprises selecting at least one second level channel from said one or more first level channels received in the first level assessment;

sending said selected at least one second level channel to the second processing circuit;

receiving, from the second processing circuit, information about one or more channels that are selected from said selected at least one second level channel, wherein each of the selected one or more channels has a respective tag that indicates a status of each of the selected one or more channels, and wherein the status of each of the selected one or more channels indicates whether the respective channel of the selected one or more channels is available, unavailable, or partly available; and sending, to the core network node, a request for negotiation for at least one of the selected one or more channels when the status of the at least one of the selected one or more channels indicates that the at least one of the selected one or more channels is partly available.

2. The method according to claim 1, wherein:
the throughput, the bandwidth, the frequency, and/or the location apply for licensed channels, unlicensed channels, and channels under primary sharing, and/or
the interference applies for the unlicensed channels and the channels under primary sharing.

3. The method according to claim 1, wherein the method further comprises:
creating a local backup of first level channels to be used when none of the one or more first level channels are received from the core network node.

4. The method according to claim 1, wherein a model, used for assessing said one or more first level channels in the second level assessment, is updated based on the information using a learning algorithm.

5. The method according to claim 4, wherein the assessing, in the second level assessment, of said one or more first level channels received in the first level assessment is performed by considering a previous second level channel assessment, thereby learning from the previous second level channel assessment.

6. A method, performed by a processing circuit of a core network node, for providing at least one channel operable by a radio network node (BS), wherein the method comprises:
receiving, from the radio network node (BS), a request for the at least one channel, wherein the request comprises a set of local parameters, and wherein the set of local parameters relates to one or more of:
throughput,
bandwidth,
interference,
frequency, and
location;
assessing channels, provided by a Global Location database, to select one or more first level channels in a first level assessment, wherein the assessment of the channels is based on the set of local parameters and a set of global parameters, and wherein the set of global parameters relates to one or more of:
frequency,
location,
spectrum sharing, and
spectrum availability;
sending the selected one or more first level channels to the radio network node (BS);
receiving, from the radio network node (BS), one or more channels selected from at least one second level channel, wherein the at least one second level channel is selected from among the selected one or more first level channels, wherein each of the selected one or more channels has a respective tag that indicates a status of each of the selected one or more channels, and wherein the status of each of the selected one or more channels indicates whether the respective channel of the selected one or more channels is available, unavailable, or partly available; and
negotiating at least one of the selected one or more channels when the status of the at least one of the selected one or more channels indicates that the at least one of the selected one or more channels is partly available.

7. The method according to claim 6, wherein:
the throughput, the bandwidth, the frequency, and/or the location apply for licensed channels, unlicensed channels, and channels under primary sharing, and/or
the interference, the spectrum sharing, and the spectrum availability apply for the unlicensed channels and the channels under primary sharing.

8. The method according to claim 6, wherein the method further comprises updating a model used for assessing the channels in the first level assessment based on the selected one or more channels using a learning algorithm.

9. The method according to claim 8, wherein the assessing of the channels to select the one or more first level channels in the first level assessment is performed by considering a previous first level channel assessment, thereby learning from the previous first level channel assessment.

10. A radio network node (BS) for handling a request for at least one channel, wherein the radio network node (BS) comprises a first processing circuit and a memory, and wherein the memory comprises computer readable code units, executable by the first processing circuit, which cause the first processing circuit to:
receive, from a second processing circuit of the radio network node (BS), the request for the at least one channel;
send, to a core network node, the request, wherein the request comprises a set of local parameters, and wherein the set of local parameters relates to one or more of:
throughput,
bandwidth,
interference,
frequency, and
location;
receive, from the core network node, one or more first level channels in a first level assessment;
assess using the set of local parameters, in a second level assessment, said one or more first level channels received in the first level assessment, wherein the assessment, in the second level assessment, of said one or more first level channels received in the first level assessment comprises selection of at least one second level channel from said one or more first level channels received in the first level assessment; and
send said selected at least one second level channel to the second processing circuit, wherein the memory further comprises computer readable code units, executable by the first processing circuit, which further cause the first processing circuit to:

receive, from the second processing circuit, information about one or more channels that are selected from said selected at least one second level channel, wherein each of the selected one or more channels has a respective tag that indicates a status of each of the selected one or more channels, and wherein the status of each of the selected one or more channels indicates whether the respective channel of the selected one or more channels is available, unavailable, or partly available; and send, to the core network node, a request for negotiation for at least one of the selected one or more channels when the status of the at least one of the selected one or more channels indicates that the at least one of the selected one or more channels is partly available.

11. The radio network node (BS) according to claim 10, wherein:

the throughput, the bandwidth, the frequency, and/or the location apply for licensed channels, unlicensed channels, and channels under primary sharing, and/or the interference applies for the unlicensed channels and the channels under primary sharing.

12. The radio network node (BS) according to claim 10, wherein the memory further comprises computer readable code units, executable by the first processing circuit, which further cause the first processing circuit to:

create a local backup of first level channels to be used when none of the one or more first level channels are received from the core network node.

13. The radio network node (BS) according to claim 10, wherein a model, used for assessing said one or more first level channels in the second level assessment, is updated based on the information using a learning algorithm.

14. The radio network node (BS) according to claim 13, wherein the memory further comprises computer readable code units, executable by the first processing circuit, which further cause the first processing circuit to assess, in the second level assessment, said one or more first level channels received in the first level assessment by considering a previous second level channel assessment, thereby learning from the previous second level channel assessment.

15. A core network node for providing at least one channel operable by a radio network node (BS), wherein the core network node comprises a processing circuit and a memory, and wherein the memory comprises computer readable code units, executable by the processing circuit, which cause the processing circuit to:

receive, from the radio network node (BS), a request for the at least one channel, wherein the request comprises a set of local parameters, and wherein the set of local parameters relates to one or more of:

throughput,
bandwidth,
interference,
frequency, and
location;

assess channels, provided by a Global Location database, to select one or more first level channels in a first level assessment, wherein the assessment of the channels is based on the set of local parameters and a set of global parameters, and wherein the set of global parameters relates to one or more of:

frequency,
location,
spectrum sharing, and
spectrum availability;

send the selected one or more selected first level channels to the radio network node (BS);

receive, from the radio network node (BS), one or more channels selected from at least one second level channel, wherein the at least one second level channel is selected from among the selected one or more first level channels, wherein each of the selected one or more channels has a respective tag that indicates a status of each of the selected one or more channels, and wherein the status of each of the selected one or more channels indicates whether the respective channel of the selected one or more channels is available, unavailable, or partly available; and negotiate at least one of the selected one or more channels when the status of the at least one of the selected one or more channels indicates that the at least one of the selected one or more channels is partly available.

16. The core network node according to claim 15, wherein:

the throughput, the bandwidth, the frequency and/or the location apply for licensed channels, unlicensed channels, and channels under primary sharing, and/or the interference, the spectrum sharing, and the spectrum availability apply for the unlicensed channels and the channels under primary sharing.

17. The core network node according to claim 15, wherein the memory further comprises computer readable code units, executable by the processing circuit, which further cause the processing circuit to update a model used for assessing the channels in the first level assessment based on the selected one or more channels using a learning algorithm.

18. The core network node according to claim 17, wherein the memory further comprises computer readable code units, executable by the processing circuit, which further cause the processing circuit to assess the channels to select the one or more first level channels in the first level assessment by considering a previous first level channel assessment, thereby learning from the previous first level channel assessment.

* * * * *